(12) United States Patent
Zillmer et al.

(10) Patent No.: US 7,987,844 B2
(45) Date of Patent: Aug. 2, 2011

(54) CATALYZED HOT GAS HEATING SYSTEM FOR CONCENTRATED SOLAR POWER GENERATION SYSTEMS

(75) Inventors: Andrew J. Zillmer, Woodland Hills, CA (US); Alfred Little, Simi Valley, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 331 days.

(21) Appl. No.: 12/319,894

(22) Filed: Jan. 13, 2009

(65) Prior Publication Data

US 2010/0175687 A1   Jul. 15, 2010

(51) Int. Cl.
*F24J 2/42* (2006.01)
(52) U.S. Cl. ............... 126/611; 126/609; 126/610
(58) Field of Classification Search ........... 126/609, 126/611, 610
See application file for complete search history.

(56) References Cited

U.S. PATENT DOCUMENTS

| | | | | |
|---|---|---|---|---|
| 2,778,610 A * | 1/1957 | Bruegger | ...................... | 126/109 |
| 2,979,310 A * | 4/1961 | Nicholson | ...................... | 165/143 |
| 3,299,947 A * | 1/1967 | Boucraut et al. | ............... | 432/58 |
| 3,618,655 A * | 11/1971 | Lockwood | ................... | 159/4.02 |
| 3,692,459 A * | 9/1972 | Erb | ................................ | 431/11 |
| 3,716,045 A * | 2/1973 | Vollhardt | .................... | 126/350.1 |
| 3,719,173 A * | 3/1973 | Viessmann | .................. | 122/149 |
| 3,779,009 A | 12/1973 | Friedman | | |
| 3,782,452 A * | 1/1974 | Ceplon | ........................ | 165/135 |
| 3,796,207 A | 3/1974 | Olson | | |
| 3,855,386 A * | 12/1974 | Moore | ..................... | 423/210.5 |
| 3,955,556 A | 5/1976 | Pangborn et al. | | |
| 3,974,784 A * | 8/1976 | Greenberg | ..................... | 588/314 |
| 4,004,573 A * | 1/1977 | Frieling et al. | ................ | 126/615 |
| 4,080,957 A * | 3/1978 | Bennett | ......................... | 126/636 |
| 4,123,837 A * | 11/1978 | Horner | ..................... | 29/890.045 |
| 4,194,536 A * | 3/1980 | Stine et al. | .................... | 138/149 |
| 4,203,186 A * | 5/1980 | Horner | ..................... | 29/890.045 |
| 4,204,407 A * | 5/1980 | Smith | ......................... | 60/641.8 |
| 4,258,698 A * | 3/1981 | Sales | ............................. | 126/700 |
| 4,286,579 A * | 9/1981 | Johnston | ....................... | 126/694 |
| 4,290,779 A * | 9/1981 | Frosch et al. | ................ | 422/186 |
| 4,300,536 A * | 11/1981 | Taschuk | ....................... | 126/615 |
| 4,347,433 A * | 8/1982 | Wojtecki et al. | .............. | 219/535 |
| 4,354,117 A * | 10/1982 | Abernathy | ..................... | 290/1 R |
| 4,415,119 A * | 11/1983 | Borking et al. | ................. | 237/19 |

(Continued)

OTHER PUBLICATIONS

"Description of the Trydyne Patent (pending)," http://www.spl.ch/publication/SPL_Papers/Tridyne-Patent.html, visited Nov. 20, 2008, 2 pages.

(Continued)

*Primary Examiner* — Kenneth B Rinehart
*Assistant Examiner* — Jorge Pereiro
(74) *Attorney, Agent, or Firm* — Kinney & Lange, P.A.

(57) ABSTRACT

A solar power generation system includes a fluid housing, a solar collector, and a heating system. The fluid housing contains a heat transfer medium. The solar collector concentrates solar energy onto the heat transfer medium. The heating system includes at least one gas tank containing a gas and fluidically connected to a first catalyst. The first catalyst is configured to catalyze gas from the gas tank to create hot gas. The heating system also includes a first hot gas pipe fluidically connected to the first catalyst and positioned with respect to the fluid housing such that hot gas flowing through the first hot gas pipe comes into thermal contact with the heat transfer medium within the fluid housing.

18 Claims, 7 Drawing Sheets

U.S. PATENT DOCUMENTS

| | | | | |
|---|---|---|---|---|
| 4,424,805 A * | 1/1984 | Neary | | 126/714 |
| 4,425,936 A * | 1/1984 | Goss | | 137/340 |
| 4,426,037 A * | 1/1984 | Bernstein | | 237/19 |
| 4,438,630 A * | 3/1984 | Rowe | | 60/676 |
| 4,438,881 A * | 3/1984 | Pendergrass | | 237/2 B |
| 4,441,460 A * | 4/1984 | Wyatt | | 122/31.1 |
| 4,455,153 A * | 6/1984 | Jakahi | | 48/62 R |
| 4,484,566 A * | 11/1984 | Gonzalez | | 126/629 |
| 4,484,618 A * | 11/1984 | Chubb | | 165/104.12 |
| 4,545,207 A * | 10/1985 | Neary | | 60/645 |
| 4,668,494 A * | 5/1987 | Van Hook | | 423/392 |
| 4,715,183 A * | 12/1987 | Meijer et al. | | 60/524 |
| 4,804,520 A | 2/1989 | Richtenburg et al. | | |
| 4,896,507 A * | 1/1990 | Hosford | | 60/641.8 |
| 4,964,797 A | 10/1990 | Hilton | | |
| 5,086,836 A * | 2/1992 | Barth et al. | | 165/164 |
| 5,505,917 A * | 4/1996 | Collier, Jr. | | 422/307 |
| 5,522,453 A * | 6/1996 | Green | | 165/41 |
| 5,586,549 A * | 12/1996 | Hartenstine et al. | | 126/635 |
| 5,588,297 A * | 12/1996 | Uehara et al. | | 60/673 |
| 5,660,165 A * | 8/1997 | Lannes | | 126/641 |
| 5,714,738 A * | 2/1998 | Hauschulz et al. | | 219/535 |
| 5,992,409 A | 11/1999 | Heimlich et al. | | |
| 6,202,656 B1 * | 3/2001 | Schmitt | | 134/107 |
| 6,539,312 B1 * | 3/2003 | Nimberger et al. | | 702/24 |
| 6,595,241 B2 * | 7/2003 | Chen | | 138/38 |
| 6,776,227 B2 * | 8/2004 | Beida et al. | | 166/61 |
| 6,872,378 B2 * | 3/2005 | Weimer et al. | | 423/650 |
| 6,877,508 B2 * | 4/2005 | Litwin | | 126/651 |
| 6,905,566 B1 * | 6/2005 | Pitzer et al. | | 156/201 |
| 7,055,519 B2 * | 6/2006 | Litwin | | 126/683 |
| 7,138,093 B2 * | 11/2006 | McKay et al. | | 422/198 |
| 7,566,218 B2 * | 7/2009 | Aldrich | | 431/185 |
| 7,694,717 B2 * | 4/2010 | Bonner et al. | | 165/80.1 |
| 2003/0037907 A1 * | 2/2003 | Lee | | 165/104.19 |
| 2003/0168518 A1 * | 9/2003 | Beida et al. | | 237/80 |
| 2004/0099261 A1 * | 5/2004 | Litwin | | 126/638 |
| 2005/0008551 A1 * | 1/2005 | McKay et al. | | 422/198 |
| 2006/0048808 A1 * | 3/2006 | Ruckman et al. | | 136/206 |
| 2006/0057518 A1 * | 3/2006 | Aldrich | | 431/116 |
| 2008/0000231 A1 * | 1/2008 | Litwin et al. | | 60/641.11 |
| 2008/0256952 A1 * | 10/2008 | Litwin et al. | | 60/641.8 |
| 2008/0276616 A1 * | 11/2008 | Flynn et al. | | 60/641.15 |
| 2008/0283622 A1 * | 11/2008 | Weiss | | 237/12.1 |
| 2008/0289334 A1 * | 11/2008 | Orosz et al. | | 60/641.8 |
| 2009/0056919 A1 * | 3/2009 | Hoffman et al. | | 165/109.1 |
| 2009/0151768 A1 * | 6/2009 | Forseth | | 136/207 |
| 2010/0108054 A1 * | 5/2010 | Ekhoff et al. | | 126/655 |
| 2010/0132694 A2 * | 6/2010 | Ota, Hideaki | | 126/634 |
| 2010/0170498 A1 * | 7/2010 | Zillmer et al. | | 126/583 |
| 2010/0170500 A1 * | 7/2010 | Zillmer et al. | | 126/640 |
| 2010/0175637 A1 * | 7/2010 | Moller et al. | | 122/4 D |

OTHER PUBLICATIONS

SPL Swiss Propulsion Laboratory, Our Products and Services, "Components Tridyne Hot Gas Devices," http:www/spl.ch/products/index.html, visited Nov. 20, 2008, 1 page.

* cited by examiner

CATALYZED HOT GAS HEATING SYSTEM FOR CONCENTRATED SOLAR POWER GENERATION SYSTEMS

CROSS-REFERENCE TO RELATED APPLICATION

The present application is related to the following co-pending application filed on the same day as this application: "CATALYZED HOT GAS HEATING SYSTEM FOR PIPES" by inventors A. Little and A. Zillmer (U.S. patent application Ser. No. 12/319,893.

BACKGROUND

The present invention relates to thermal energy collecting systems, and in particular, to heating a molten storage medium used in thermal energy collecting systems.

Throughout the world there is an increasing demand for energy, which is typically provided by fossil fuels such as petroleum and coal. Additionally, due to scarcity and adverse environmental effects of fossil fuels, cleaner, renewable energy sources are becoming more desirable. As technology advances, alternative fuel sources are becoming practical to replace, or at least augment, conventional power plants to meet worldwide energy demand in a clean manner. In particular, solar energy is freely available and is becoming more feasible, especially in the form of concentrated solar power, which allows for energy storage and can be scaled for commercial production.

Concentrated solar power generation systems typically comprise solar collectors that focus solar rays onto a heat transfer medium such as a molten salt. For example, solar power towers use an array of thousands of heliostats to concentrate energy on an elevated central receiver through which molten salt flows inside of numerous pipes. In solar trough systems, molten salt flows through extended lengths of piping which are shrouded by solar collecting troughs that concentrate energy along lengths of the pipes. Heat from the solar energy is transferred to the molten salt and then through a heat exchanger to another medium, such as air or water, which is then used to generate mechanical energy that is ultimately converted to electrical power. Molten salt efficiently stores heat from the solar energy for extended periods of time such that electrical power can be generated at night or during other periods of low solar collection.

Molten salts can solidify if cooled below a certain temperature. Consequently, pipes and tanks holding the molten salt are typically wrapped in electrical trace heating elements (electrical resistance wires). Electrical trace heating can, however, be relatively expensive, increasing total cost of power production. Moreover, electrical trace heating can be prone to failure, causing the entire solar power generation system to require shut-down for maintenance. There is, therefore, a need for improved heating of pipes and tanks for the heat transfer medium in a solar power generation system.

SUMMARY

According to the present invention, a solar power generation system includes a fluid housing, a solar collector, and a heating system. The fluid housing contains a heat transfer medium. The solar collector concentrates solar energy onto the heat transfer medium. The heating system includes at least one gas tank containing a gas and fluidically connected to a first catalyst. The first catalyst is configured to catalyze gas from the gas tank to create hot gas. The heating system also includes a first hot gas pipe fluidically connected to the first catalyst and positioned with respect to the fluid housing such that hot gas flowing through the first hot gas pipe comes into thermal contact with the heat transfer medium within the fluid housing.

DETAILED DESCRIPTION

In general, the present invention includes a heating system for heating a heat transfer medium in a concentrated solar power generation system. The heating system includes catalysts positioned near various parts of the solar power generation system that can contain the heat transfer medium. A blend of fuel and air is blown across the catalysts, reacts, and creates heat which is then transferred to the various parts and ultimately to the heat transfer medium.

Figure 1:
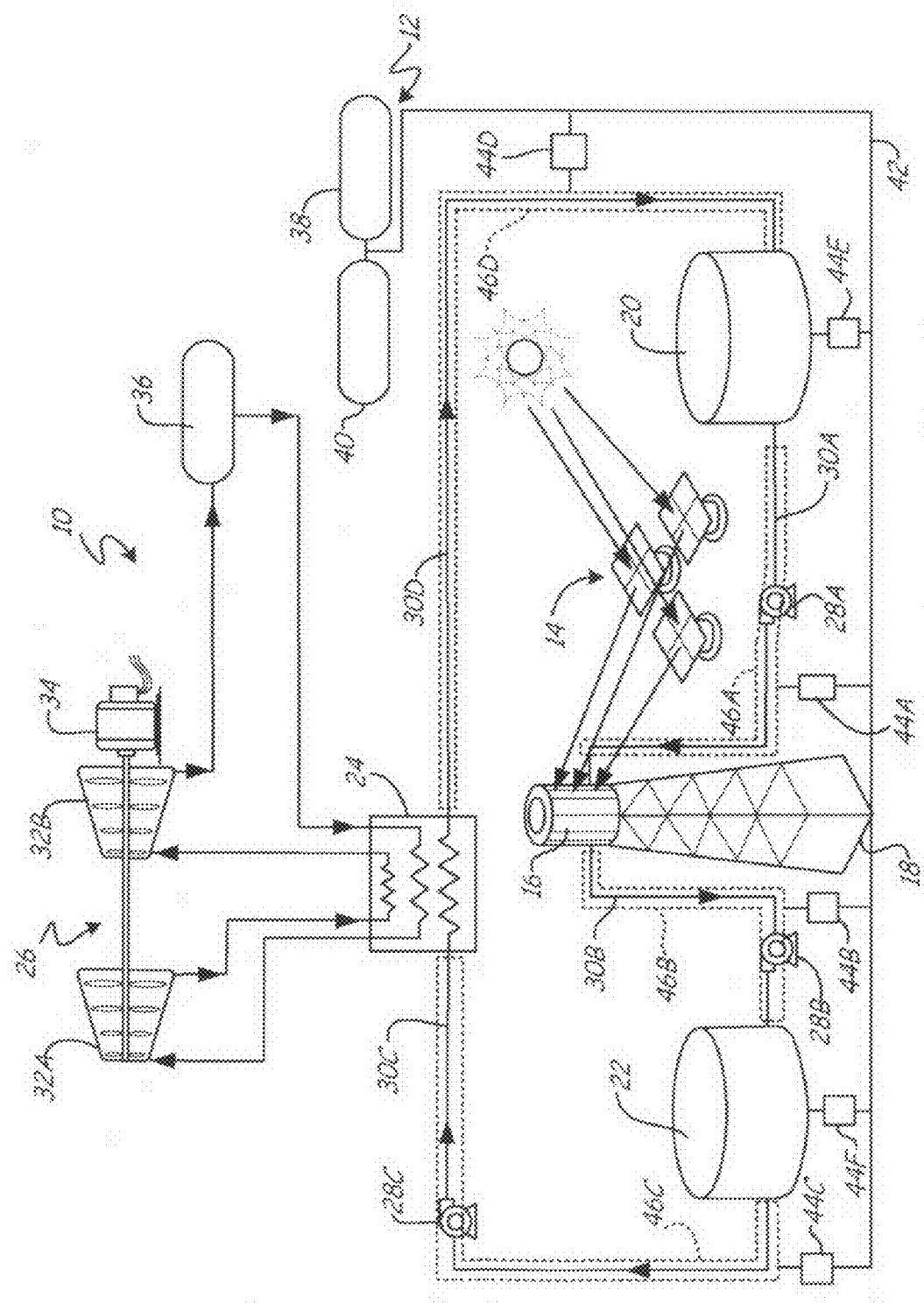
FIG. 1 shows a schematic diagram of a concentrated solar power generation system having a heating system of the present invention.

FIG. 1 shows a schematic diagram of concentrated solar power generation system 10 having heating system 12 of the present invention. In the embodiment shown, power generation system 10 comprises a power tower system having solar collector system 14, central receiver 16, tower 18, cold storage tank 20, hot storage tank 22, heat exchanger 24, generator 26, pumps 28A, 28B and 28C, and pipes 30A, 30B, 30C and 30D. In other embodiments, power generation system 10 may comprise a beam down solar power generation system or a parabolic trough solar power generation system. Solar collector system 14 and central receiver 16 impart heat from the sun into a molten heat transfer medium contained in storage tanks 20 and 22 such that thermal energy can be converted to electrical energy using heat exchanger 24 and conversion system 26.

Solar collector system 14 comprises an array of sun-tracking mirrors, or heliostats, that concentrate solar rays at central receiver 16 to heat a heat transfer medium located within pipes 30A-30D. In one embodiment, approximately 8,500 heliostats, each having a having surface area of about 42 m² (square meters) to about 150 m², are arranged concentrically around a tower, having a height of approximately 170 meters, to cover an area of approximately 1 to 2 square mile (~2.59 to ~5.18 square kilometers). The heat transfer medium typically comprises molten salt that is maintained in a molten state between approximately 500° F. (~260.0° C.) and 1200° F. (~648.9° C.) such that it remains liquid. Through pipe 30A, pump 28A directs cool heat transfer medium from cold storage tank 20 into a plurality of tubes within central receiver 16 whereby heat from the concentrated solar rays is imparted into the heat transfer medium. Through pipe 30B, pump 28B directs the heated heat transfer medium from receiver 16 to hot storage tank 22 where it is stored in a state ready for producing power with heat exchanger 24. When power is desired to be produced, heated heat transfer medium is routed through pipe 30C by pump 28C from hot storage tank 22 to heat exchanger 24 where heat is input into conversion system 26. Conversion system 26 may comprise any conventional system that converts thermal energy to mechanical energy, such as Brayton cycle or Rankine cycle systems. In the embodiment shown, conversion system 26 comprises a steam turbine generator having first stage expander 32A, second stage expander 32B, generator 34 and condenser 36. Water within heat exchanger 24 is heated by the molten heat transfer medium to produce steam that turns first and second stage expanders 32A and 32B. Expanders 32A and 32B rotate a shaft to drive generator 34 to convert mechanical energy to electrical energy. Heat exchanger 24 therefore removes heat from the heat transfer medium before the heat transfer medium is returned to cold storage tank 20 through pipe 30D. Although solar power generation system 10 is shown using three pumps to move molten salt through pipes 30A-30D, more or fewer pumps can be used. For example, in various embodiments, the height of tower 18 provides enough pressure to move the molten salt into hot storage tank 22 such that pump 28B is not needed.

The use of a heat transfer medium such as molten salt allows power generation system 10 to efficiently store thermal energy in salt contained in hot storage tank 22 such that electrical power can be generated at times when solar collector system 14 is operating below peak. Thus, power generation system 10 can be run 24 hours a day at low power production or at higher production levels for shorter intervals. In various embodiments, the molten salt can be salts composed of alkaline earth fluorides and alkali metal fluorides, and combinations thereof. Suitable elements of the molten salt include: Lithium (Li), Sodium (Na), Potassium (K), Rubidium (Rb), Cesium (Cs), Francium (Fr), Beryllium (Be), Magnesium (Mg), Calcium (Ca), Strontium (Sr), Barium (Ba), Radium (Ra), and Fluorine (F). Examples of suitable fluoride molten salts include, but are not limited to: FLiNaK, FLiBe, FLiNaBe, FLiKBe, and combinations thereof, as is described in greater detail in U.S. Pat. App. No. 2008/0000231 to Litwin et al. In other embodiments, other suitable heat transfer media may be used.

Salts, however, need to be maintained at elevated temperatures to remain in a molten state such that the salt can flow between components of power generation system 10 using pipes 30A-30D and pumps 28A-28C. Thus, heating system 12 is provided throughout power generation system 10 to maintain the salt at elevated temperatures. Heating system 12 includes fuel tank 38, compressed gas tank 40, gas supply pipe 42, catalysts 44A-44F, and pipe heating zones 46A-46D. Heating system 12 also includes elements (not shown in FIG. 1) inside of cold storage tank 20 and hot storage tank 22. Fuel tank 38 can hold a compressed, combustible gas such as hydrogen or methane. Compressed gas tank 40 can hold compressed ordinary air, with atmospheric levels of oxygen and nitrogen. Fuel from fuel tank 38 can be blended with air from compressed gas tank 40 at levels that will not combust under ordinary conditions. This blend of fuel and air is then supplied to various locations in power generation system 10 via gas supply pipe 42 and blown across catalysts 44A-44F. The catalyst material used for catalysts 44A-44F can include a noble metal such as platinum, palladium, rhodium, or other suitable catalyst materials. In one embodiment, catalysts 44A-44F can include a chamber containing a plurality of relatively small pellets (not shown). The small pellets can comprise a suitable catalyst material deposited on a parent material such as alumina (also known as aluminum oxide). As the blend of fuel and air passes across the small pellets, the fuel reacts with the oxygen and is combusted, which heats the product of the reaction and any gases that do not react, such as nitrogen and any remaining oxygen. Thus, catalyzed hot gas is created for use at cold storage tank 20, hot storage tank 22, and each of pipe heating zones 46A-46D to maintain the molten salt at a particular temperature. Pipe heating zones 46A-46D provide heat to portions of pipes 30A-30D, respectively. In the illustrated embodiment, pipe heating zones 46A-46D provide heat to substantially an entire length of pipe where the molten salt flows. Only relatively small gaps of pipe exist without any pipe heating.

Heating system 12 can be used to heat the molten salt in a variety of circumstances. For example, when heat exchanger 24 extracts heat out of the molten salt, the molten salt may drop near or below a minimum desired temperature. Heating system 12 can be used to maintain the desired temperature until the molten salt is delivered back to central receiver 16 to be heated by solar rays. Similarly, during periods of limited sun exposure, such as nighttime, temperature of the molten salt throughout most or all of power generation system 10 can drop near or below a minimum desired temperature. Heating system 12 can be used to maintain the desired temperature until adequate sun exposure returns. In certain circumstances, it may be desirable to allow the molten salt to solidify over night instead of continuously heating it. In that case, heating system 12 can be used to re-melt the salt each morning. Alternatively, cold storage tank 20 and hot storage tank 22 can be continually heated over night while only pipes 30A-30D are allowed to cool below the desired temperature. Heating system 12 can also be used to melt salt any time it becomes necessary, such as during an initial start-up of power generation system 10.

In each of the above heating examples, different areas of power generation system 10 can require different amounts of heat. Heating system 12 can use a set of valves or regulators to vary the amount of heat applied to each area by varying the amount of fuel and air delivered to each catalyst 44A-44F. For example, heating system 12 can supply a relatively large quantity of fuel and air to catalysts 44D, 44E, and 44A when salt is relatively cold in pipe 30D, cold storage tank 20, and pipe 30A, while supplying little or no fuel and air to catalysts 44B, 44F, and 44C when salt is relatively hot in pipe 30B, hot storage tank 22, and pipe 30C. Temperature sensors can be placed throughout power generation system 10 to provide temperature information to help determine where heat is needed. In other embodiments, heating system 12 can include more or less catalysts depending on needs of power generation system 10.

Catalysts 44A-44F can be located at or near their respective areas of heating in order to reduce an amount of time it takes the catalyzed hot gas to reach its intended target. In one embodiment, fuel and air in gas supply pipe 42 can be mixed with a ratio that has little or no chance of combusting without a catalyst. This allows fuel and air to be piped relatively long distances through gas supply pipe 42 with little to no risk of fire or explosion even if gas supply pipe 42 is breached.

Figure 2:
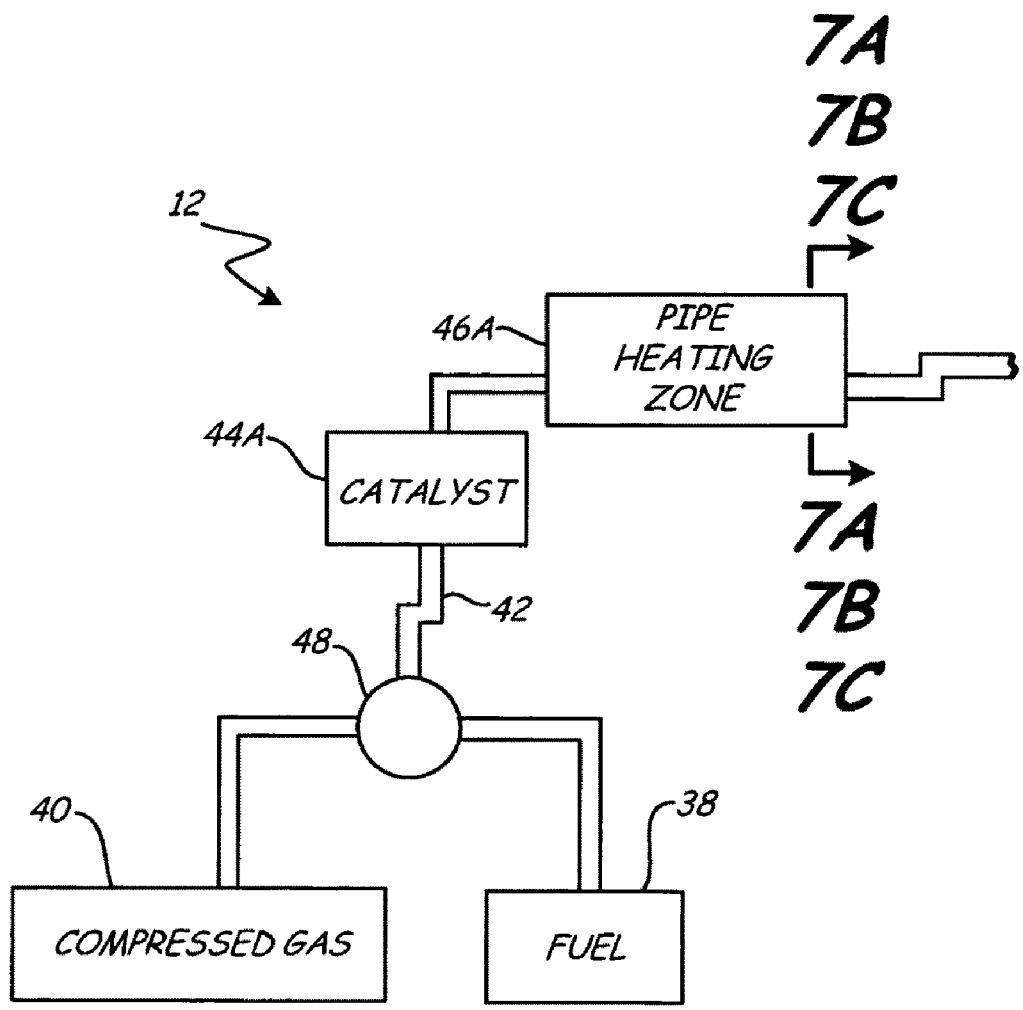
FIG. 2 is a schematic diagram of a first embodiment of a portion of the heating system of FIG. 1.

FIG. 2 is a schematic diagram of a first embodiment of a portion of heating system 12. FIG. 2 shows that portion of heating system 12 including catalyst 44A and pipe heating zone 46A for heating pipe 30A. Although FIG. 2 illustrates only one portion of heating system 12, pipes 30B-30D (shown in FIG. 1) can be heated by catalysts 44B-44D and pipe heating zones 46B-46D in a similar manner. In the first embodiment, valve 48 blends air from compressed gas tank 40 with fuel from fuel tank 38 to create a desired ratio of fuel to air. In one embodiment, valve 48 can be a small servo valve. In another embodiment, valve 48 could be a more complex combination of regulators. Operation of valve 48 can be controlled by a controller connected to temperature sensors located throughout heating system 12. The blend of fuel and air is passed over catalyst 44A where it reacts and creates a catalyzed hot gas. The catalyzed hot gas is then passed through pipe heating zone 46A to heat pipe 30A (not shown in FIG. 2) and is ultimately exhausted to the atmosphere.

Figure 3:
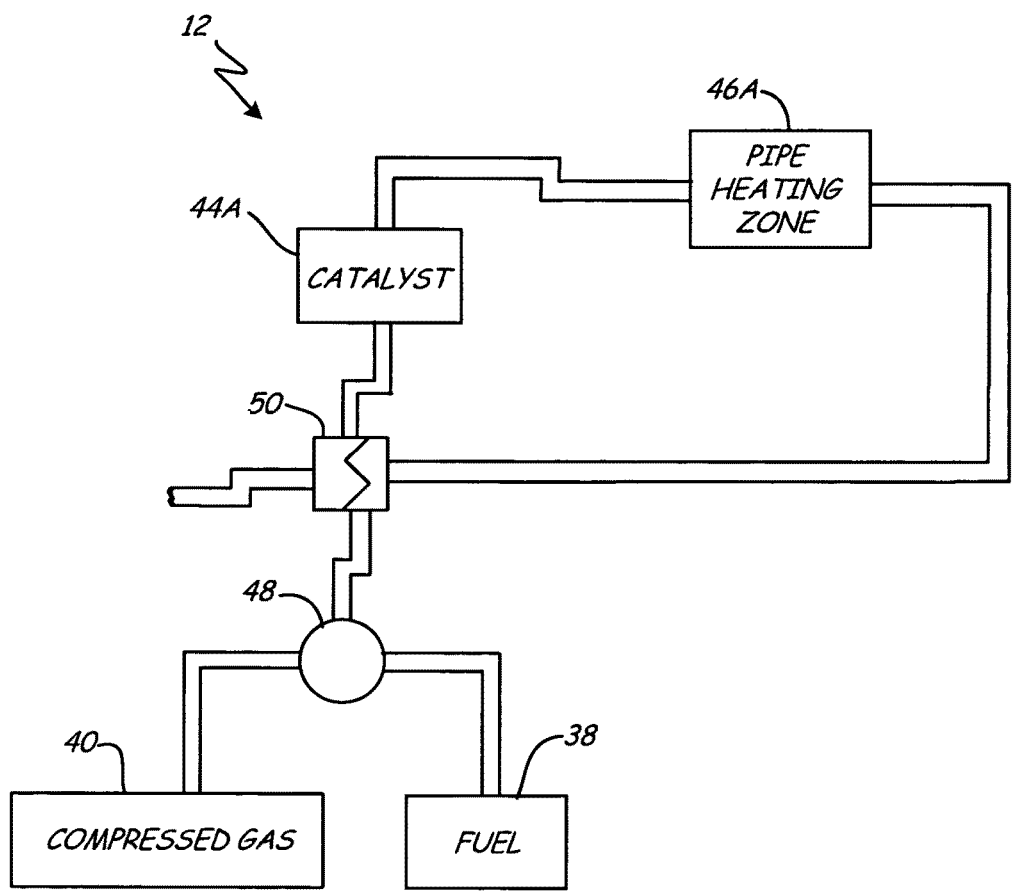
FIG. 3 is a schematic diagram of a second embodiment of a portion of the heating system of FIG. 1.

FIG. 3 is a schematic diagram of a second embodiment of a portion of heating system 12. The second embodiment of heating system 12 is similar to the first embodiment of heating system 12 except for the addition of gas heat exchanger 50. In the second embodiment, the blend of fuel and air is passed through gas heat exchanger 50 prior to entering catalyst 44A. Catalyzed hot gas from catalyst 44A is piped through pipe heating zone 46A and then through gas heat exchanger 50 prior to exhausting to atmosphere. The catalyzed hot gas leaving pipe cools as it passes through pipe heating zone 46A but is still warm relative to the blend of fuel and air prior to entering catalyst 44A. Consequently, gas heat exchanger 50 can transfer heat from the catalyzed hot gas to noncatalyzed fuel and air prior to the catalyzed hot gas being exhausted to the atmosphere. In certain applications, heating the blend of fuel and air prior to catalyzing can increase efficiency of that catalytic process. As with the first embodiment, pipes 30B-30D can also be heated as described in the second embodiment.

Figure 4:
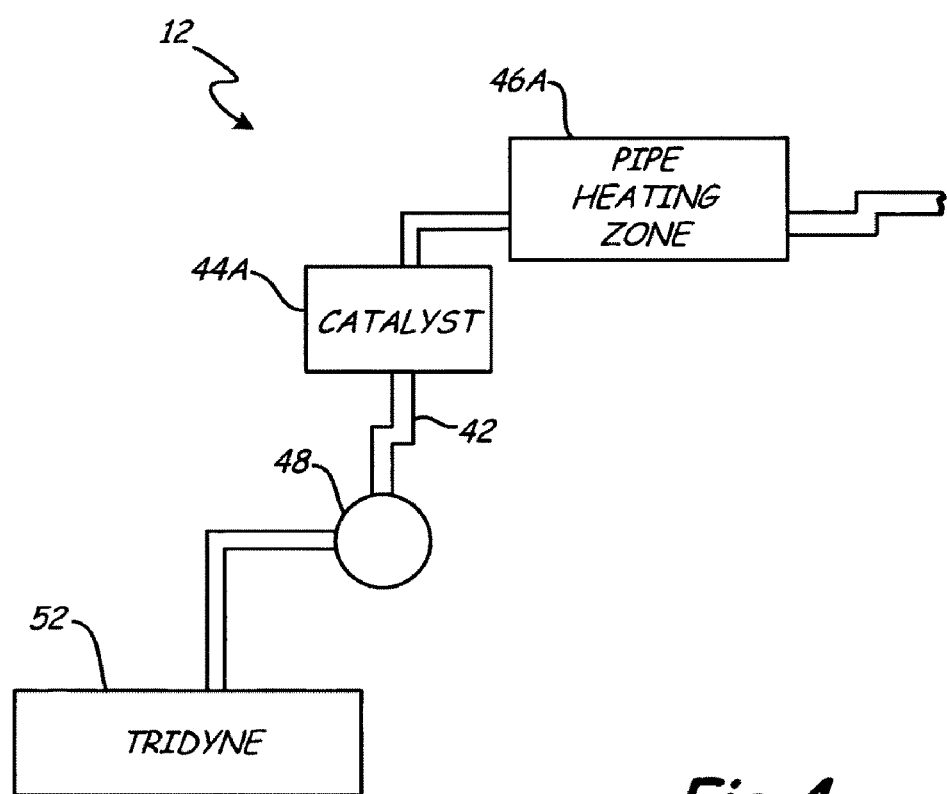
FIG. 4 is a schematic diagram of a third embodiment of a portion of the heating system of FIG. 1.

FIG. 4 is a schematic diagram of a third embodiment of a portion of heating system 12. The third embodiment of heating system 12 is similar to the first embodiment of heating-system 12 except that fuel tank 38 and compressed gas tank 40 are replaced with Tridyne tank 52. Tridyne is a gas that includes various mixtures of inert gas and relatively small fractions of fuel and oxidizer. Tridyne is non-reactive under ordinary conditions but becomes reactive upon exposure to a catalyst. The fuel used for Tridyne can be hydrogen, methane, ethane, or a mixture thereof. The oxidizer used for Tridyne can be air, oxygen, or oxygen diflouride, or a mixture thereof. The inert gas for Tridyne can be nitrogen, helium, argon, xenon, krypton, or a mixture thereof. The catalyst used for catalysts 44A-44F can include any suitable catalyst material such as those described with respect to FIG. 1. Composition and use of Tridyne is further described in U.S. Pat. No. 3,779,009—CATALYTIC METHOD OF PRODUCING HIGH TEMPERATURE GASES by Joseph Friedman, which is herein incorporated by reference.

Because Tridyne is substantially non-reactive under ordinary conditions, it can be stored in a single tank without fear of explosion. Using a single tank of Tridyne allows heating system 12 to be further simplified. Additionally, ordinary air may contain substances that can be harmful to power generation system 10 under certain applications. Use of Tridyne, such as a blend including nitrogen, hydrogen, and oxygen, can reduce exposure to contaminants found in ordinary air. As with the first and second embodiments, pipes 30B-30D can also be heated as described in the third embodiment.

Figure 5:
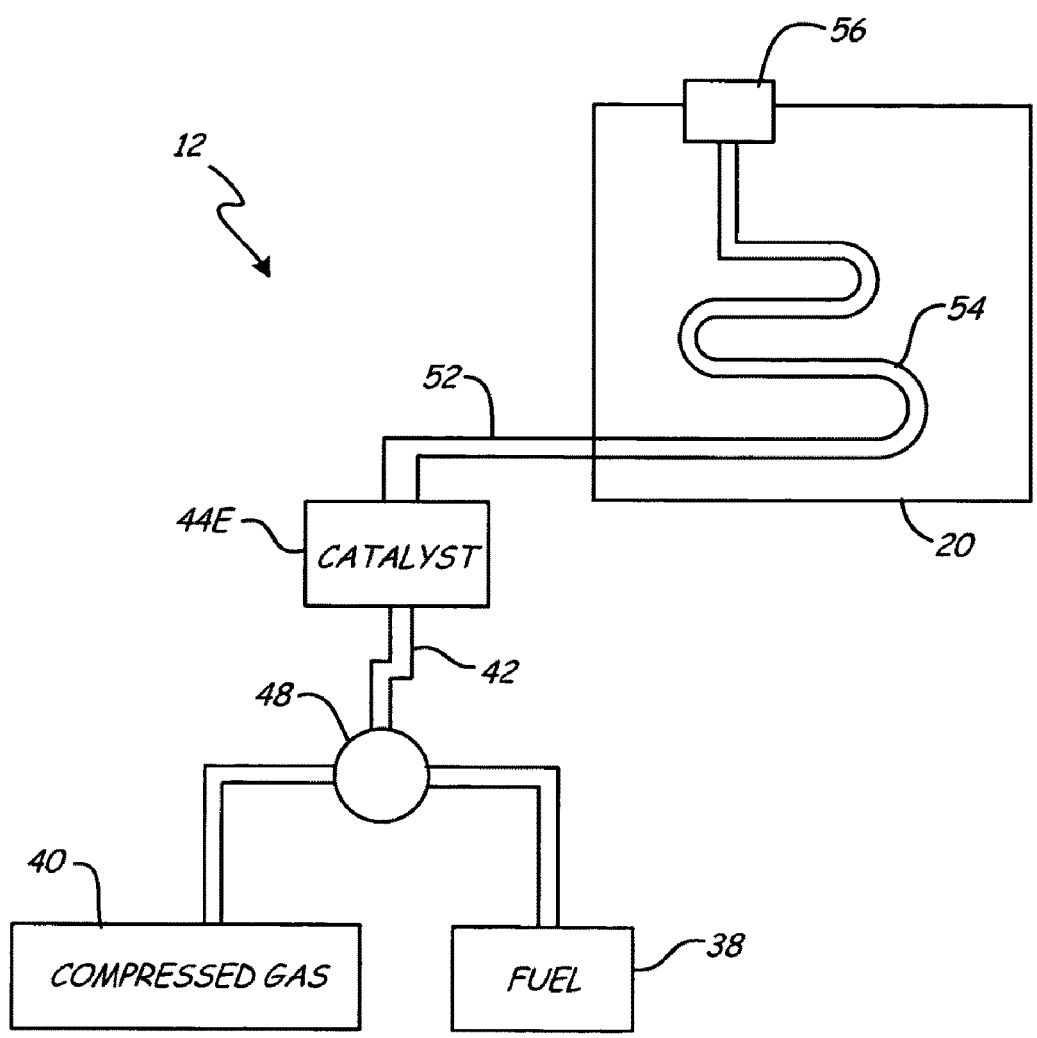
FIG. 5 is a schematic diagram of fourth embodiment of a portion of the heating system of FIG. 1.

FIG. 5 is a schematic diagram of a fourth embodiment of a portion of heating system 12. FIG. 5 shows that portion of heating system 12 including catalyst 44E for heating cold storage tank 20. Although FIG. 5 illustrates only one portion of heating system 12, hot storage tank 22 can be heated by catalyst 44F in a similar manner. In the fifth embodiment, valve 48 blends air from compressed gas tank 40 with fuel from fuel tank 38 to create a desired ratio of fuel to air. The blend of fuel and air is passed over catalyst 44E, through tank inlet pipe 52, and into cold storage tank 20. As the catalyzed hot gas enters cold storage tank 20, it flows through tank heat exchanger 54. In the illustrated embodiment, tank heat exchanger 54 is a tube that winds through cold storage tank 20. In other embodiments, other suitable heat exchangers can be used so long as they allow heat transfer from the catalyzed hot gas to the salt while preventing the catalyzed hot gas from mixing with the salt. The catalyzed hot gas eventually exits cold storage tank 20 via vent 56. In another embodiment, gas heat exchanger 50 can be used to recover heat from catalyzed hot gas vented from cold storage tank 20 in a manner similar to that described with respect to FIG. 3.

Figure 6:
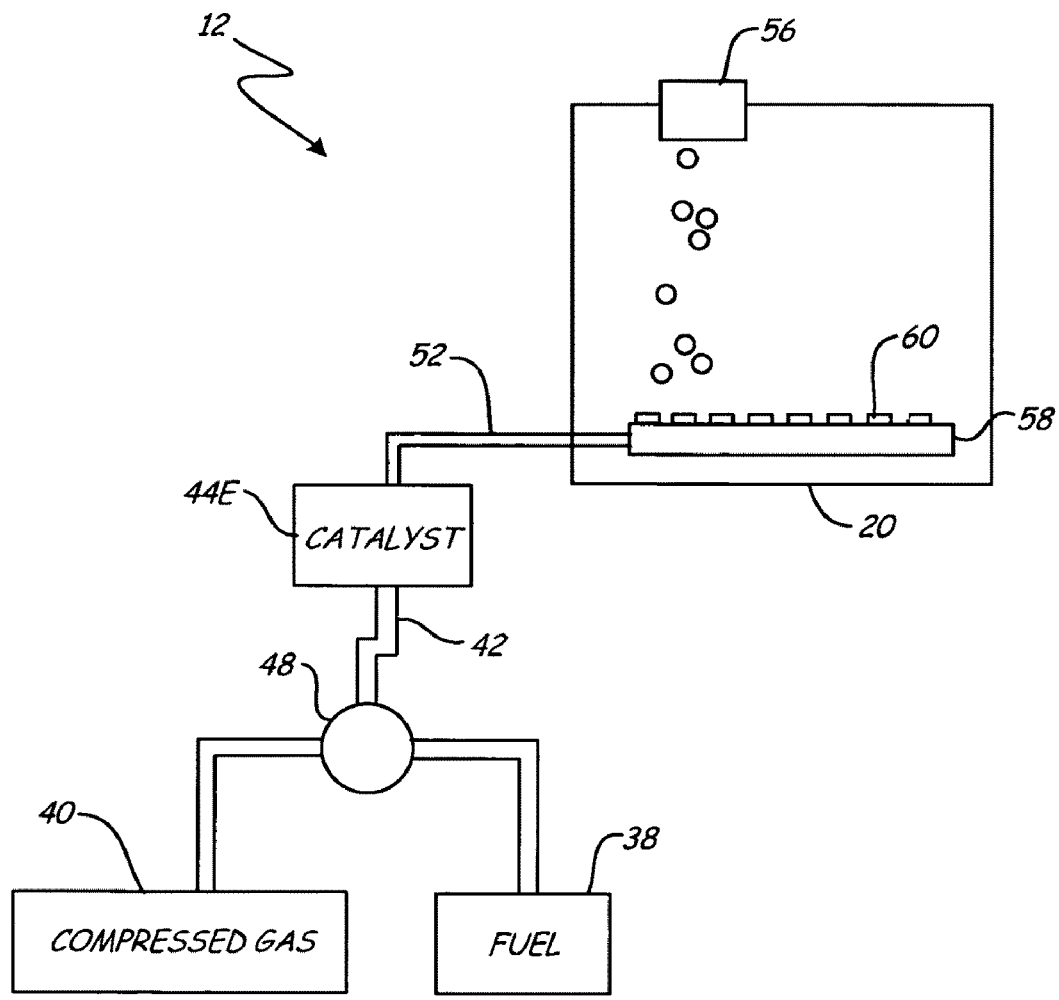
FIG. 6 is a schematic diagram of a fifth embodiment of a portion of the heating system of FIG. 1.

FIG. 6 is a schematic diagram of a fifth embodiment of a portion of heating system 12. The fifth embodiment is similar to the fourth embodiment except that tank heat exchanger 54 is replaced with gas distribution manifold 58. Gas distribution manifold 58 blows catalyzed hot gas through orifices 60 into direct contact with the salt of cold storage tank 20. When the salt is originally placed into the tank, it can be solid granules of salt which the catalyzed hot gas can flow over and through. After the salt is heated, it can be molten salt which the catalyzed hot gas can bubble through. The catalyzed hot gas eventually exits cold storage tank 20 via vent 56.

Catalyzing hydrogen or methane with ordinary air creates catalyzed hot gas that typically will not react with molten salt or otherwise adversely effect power generation system 10. Other heat transfer media may, however, require careful selection of fuel in fuel tank 38 and gas in compressed gas tank 40 in order to prevent the catalyzed hot gas from negatively reacting with the heat transfer media. In an alternative embodiment, Tridyne can be catalyzed for heating cold storage tank 20. Use of Tridyne can be particularly beneficial when power generation system 10 uses a heat transfer medium that can be harmed by contacting substances in ordinary air. In another embodiment, gas heat exchanger 50 can be used to recover heat from catalyzed hot gas vented from cold storage tank 20 in a manner similar to that described with respect to FIG. 3. As with the fourth embodiment, hot storage tank 22 can also be heated as described in the fifth embodiment.

Figure 7A:
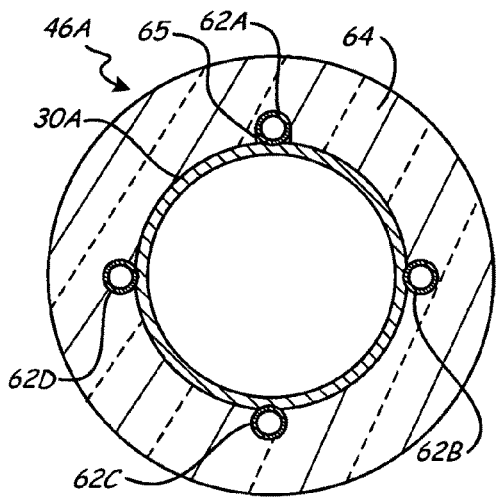
FIG. 7A is a sectional view of a first embodiment of a pipe heating zone along section 7A-7A of FIG. 2.

FIG. 7A is a sectional view of a first embodiment of pipe heating zone 46A along section 7A-7A of FIG. 2. In the first embodiment, pipe heating zone 46A includes hot gas pipes 62A-62D and insulation 64. Hot gas pipes 62A-62D are relatively small tubes physically adjacent to an exterior surface of pipe 30A. In one embodiment, hot gas pipes 62A-62D can be made of stainless steel. Catalyzed hot gas flows through hot gas pipes 62A-62D to transfer heat to salt in pipe 30A. In the illustrated embodiment, hot gas pipes 62A-62D run parallel to pipe 30A and are spaced substantially symmetrically around pipe 30A. Hot gas pipe 62A is on an opposite side of pipe 30A from hot gas pipe 62C while hot gas pipe 62B is on an opposite side of pipe 30A from hot gas pipe 62D. In an alternative embodiment, hot gas pipes 62A-62D can spiral around pipe 30A. In yet another alternative embodiment, the number of hot gas pipes can be fewer than four to reduce cost or can be greater than four to increase surface area of contact between the hot gas pipes and pipe 30A. Insulation 64 is a layer of thermally insulating materials covering hot gas pipes 62A-62D and pipe 30A. Insulation 64 reduces heat loss from hot gas pipes 62A-62D to the atmosphere so that more heat can be transferred to salt in pipe 30A.

Shoe 65 is physically adjacent to hot gas pipe 62A and to pipe 30A for increasing heat conduction between the pipes. In the illustrated embodiment, shoe 65 is between portions of hot gas pipe 62A and pipe 30A, but a portion of hot gas pipe 62A is also directly adjacent to pipe 30A. In another embodiment, shoe 65 can be a larger cradle, physically separating hot gas pipe 62A from pipe 30A while still facilitation heat transfer. Shoe 65 can be made from stainless steel, copper, or other suitable heat conducting materials. Pipe heating zones 46B-46D can also configured as described in this first embodiment.

Figure 7B:
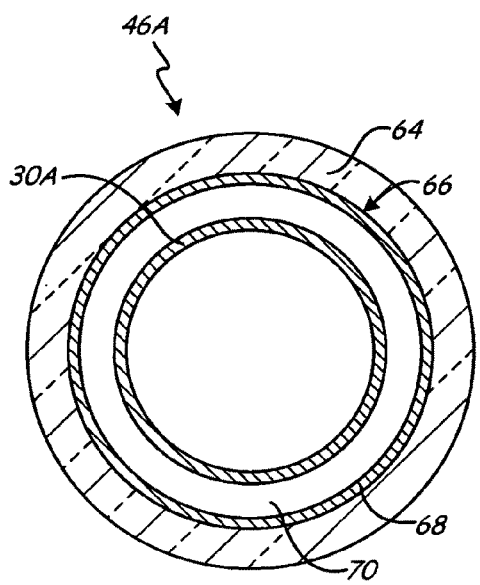
FIG. 7B is a sectional view of a second embodiment of the pipe heating zone along section 7B-7B of FIG. 2.

FIG. 7B is a sectional view of a second embodiment of pipe heating zone 46A along section 7B-7B of FIG. 2. The second embodiment is similar to the first embodiment except that hot gas pipes 62A-62D are replaced with heating passage 66. Heating passage 66 includes a passage outer wall 68 spaced concentrically with pipe 30A. Catalyzed hot gas flows through annular region 70 between an outer surface of pipe 30A and an inner surface of passage outer wall 68. Pipe heating zones 46B-46D can also configured as described in this second embodiment.

Figure 7C:
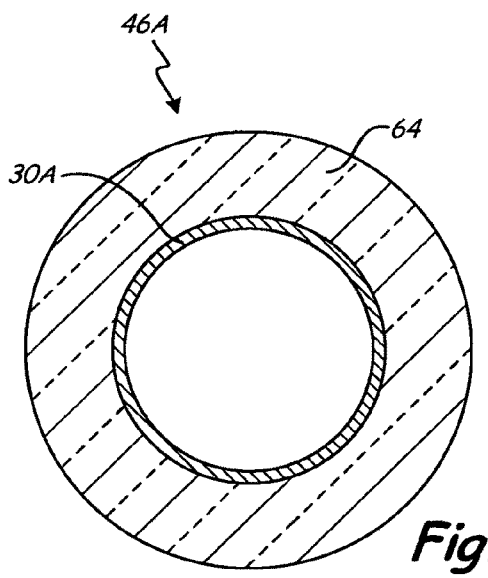
FIG. 7C is a sectional view of a third embodiment of the pipe heating zone along section 7C-7C of FIG. 2.

FIG. 7C is a sectional view of a third embodiment of pipe heating zone 46A along section 7C-7C of FIG. 2. The third embodiment is similar to the first embodiment except that hot gas pipes 62A-62D are omitted. Instead, catalyzed hot gas flows through pipe 30A. The catalyzed hot gas heats salt in pipe 30A through direct contact and is eventually vented to the atmosphere while the molten salt is retained in pipe 30A. This method can benefit from using gases selected so as to avoid adversely reacting with the heat transfer medium. This method can also be used to heat pipe 30A when it is empty, to control temperature changes during startup or shutdown procedures. The methods of heating pipe heating zone 46A described with respect to FIGS. 7A, 7B, and 7C can also be used to heat pipe heating zones 46B-46D.

Although the invention has been described using molten salt as the heat transfer medium, this invention is not limited to heating molten salt. The systems and methods describe above can be used to heat virtually any heat transfer media suitable for use in a concentrated solar power generation system.

It will be recognized that the present invention provides numerous benefits and advantages. For example, heating with catalyzed hot gas as in the current invention has a higher conversion efficiency (conversion of fuel to heat) than heating with electrical traces. This is because for electric heating, energy in the fuel must first be converted into electricity and then converted from electricity to heat. Catalyzed hot gas has one step of converting the fuel to heat. This increase in conversion efficiency can be a cost savings.

Additionally, heating with catalyzed hot gas can be relatively reliable. Electrical trace heating is typically more prone to failure than pipes and catalysts. Electrical traces can burn out or be stuck on. Furthermore, in the event of a loss of electrical power, a catalyzed hot gas heating system can continue to operate while an electrical trace heating system can fail.

Moreover, heating with catalyzed hot gas can be better for the environment. Electricity created by burning fossil fuels at high temperatures, for example, often creates various pollutants such as nitrogen oxide. Catalyzing hydrogen or methane can be a relatively clean combustion process, creating byproducts of mostly water and carbon dioxide. Because hydrogen and methane catalyze at a relatively low temperature, little or no nitrogen oxide is produced.

Although the present invention has been described with reference to particular embodiments, workers skilled in the art will recognize that changes may be made in form and detail without departing from the scope of the invention as claimed. For example, heating pipes with catalyzed hot gas as described above need not be limited to heating molten salt in a solar power generation system. These methods may be used to heat fluid pipes in other industrial process systems that are compatible with these methods.

The invention claimed is:

1. A solar power generation system comprising:
   a fluid housing, wherein the fluid housing comprises at least one hot storage tank, at least one cold storage tank, and a heat transfer medium pipe fluidically connecting the hot storage tank to the cold storage tank;
   a heat transfer medium within the fluid housing;
   a solar collector for concentrating solar energy onto the heat transfer medium; and
   a heating system for heating the fluid housing, the heating system comprising:
      at least one gas tank containing a gas;
      a first catalyst fluidically connected to the at least one gas tank, wherein the first catalyst is configured to catalyze gas from the gas tank to create hot gas, wherein the first catalyst is positioned relatively near the cold storage tank for providing hot gas to the cold storage tank;
      a first hot gas pipe fluidically connected to the first catalyst and positioned with respect to the fluid housing such that hot gas flowing through the first hot gas pipe comes into thermal contact with the heat transfer medium within the fluid housing;
      a second catalyst fluidically connected to the at least one gas tank and positioned relatively near a first portion of the heat transfer medium pipe for providing hot gas to the first portion of the heat transfer medium pipe;
      a third catalyst fluidically connected to the at least one gas tank and positioned relatively near a second portion of the heat transfer medium pipe for providing hot gas to the second portion of the heat transfer medium pipe; and
      a fourth catalyst fluidically connected to the at least one gas tank and positioned relatively near the hot storage tank for providing hot gas to the hot storage tank.

2. The solar power generation system of claim 1, wherein the heat transfer medium comprises a molten salt.

3. The solar power generation system of claim 1, and further comprising:
   a heat exchanger positioned inside the fluid housing and fluidically connected to the first hot gas pipe; and
   a vent fluidically connected to the heat exchanger such that hot gas piped into the heat exchanger is vented to the atmosphere and remains substantially fluidically isolated from the heat transfer medium in the fluid housing.

4. The solar power generation system of claim 1, and further comprising:
   a gas distribution manifold fluidically connected to the first hot gas pipe and positioned inside the fluid housing, the gas distribution manifold having at least one orifice for blowing hot gas into the fluid housing in physical contact with the heat transfer medium.

5. The solar power generation system of claim 4, and further comprising:
   a fluid housing vent for releasing hot gas from the fluid housing.

6. The solar power generation system of claim 1, and further comprising:
   a solar receiver fluidically connected to the heat transfer medium pipe between the hot storage tank to the cold storage tank.

7. The solar power generation system of claim 1, wherein the at least one gas tank comprises a gas tank for holding Tridyne.

8. The solar power generation system of claim 1, wherein the at least one gas tank comprises a first gas tank for holding air and a second gas tank for holding fuel selected from a group consisting of hydrogen and methane.

9. The solar power generation system of claim 8, and further comprising:
at least one valve between the first tank, the second tank, and the first catalyst.

10. A method for heating a heat transfer medium in a solar power generation system, the method comprising:
flowing a gaseous mixture across a catalyst bed;
catalyzing the gaseous mixture to create a hot gas;
flowing the hot gas through a passage in thermal contact with the heat transfer medium;
transferring heat from the hot gas to the heat transfer medium;
flowing the gaseous mixture through a heat exchanger prior to flowing the gaseous mixture across the catalyst bed; and
flowing the hot gas through the heat exchanger after transferring heat from the hot gas to the heat transfer medium.

11. The method of claim 10, and further comprising:
flowing the heat transfer medium to a solar receiver for absorbing solar rays.

12. The method of claim 10, wherein the heat transfer medium comprises a salt, and wherein transferring heat from the hot gas to the salt melts the salt from a solid.

13. The method of claim 10, wherein a portion of the passage comprises a heat exchanger positioned inside a tank of the heat transfer medium.

14. The method of claim 10, and further comprising:
flowing the hot gas into a fluid housing containing the heat transfer medium;
bubbling the hot gas through the heat transfer medium; and
venting the hot gas out of the fluid housing.

15. The method of claim 10, wherein the gaseous mixture is Tridyne.

16. The method of claim 10, and further comprising:
mixing a fuel from a first tank with air from a second tank to create the gaseous mixture, wherein the fuel is selected from a group consisting of hydrogen and methane.

17. A method for heating a heat transfer medium in a solar power generation system, the method comprising:
flowing a gaseous mixture from a main pipe across a first catalyst bed to create catalyzed hot gas;
heating a tank containing the heat transfer medium with catalyzed hot gas from the first catalyst bed;
flowing the gaseous mixture from the main pipe across a second catalyst bed to create catalyzed hot gas;
heating a first pipe containing the heat transfer medium with catalyzed hot gas from the second catalyst bed;
flowing the gaseous mixture from the main pipe across a third catalyst bed to create catalyzed hot gas; and
heating a second pipe containing the heat transfer medium with catalyzed hot gas from the third catalyst bed.

18. The method of claim 17, wherein each of the first, second, and third catalysts are located relatively near the tank, the first pipe, and the second pipe, respectively.

* * * * *

UNITED STATES PATENT AND TRADEMARK OFFICE
CERTIFICATE OF CORRECTION

| | | |
|---|---|---|
| PATENT NO. | : 7,987,844 B2 | Page 1 of 1 |
| APPLICATION NO. | : 12/319894 | |
| DATED | : August 2, 2011 | |
| INVENTOR(S) | : Andrew J. Zillmer et al. | |

It is certified that error appears in the above-identified patent and that said Letters Patent is hereby corrected as shown below:

Col. 6, Line 61
Delete "materials"
Insert --material--

Signed and Sealed this
Twentieth Day of December, 2011

David J. Kappos
*Director of the United States Patent and Trademark Office*